United States Patent [19]

Puziss

[11] Patent Number: 4,499,365
[45] Date of Patent: Feb. 12, 1985

[54] PORTABLE HEATER FOR RADIANTLY HEATING THE UNDERBODY OF A MOTOR VEHICLE

[76] Inventor: Abe Puziss, 610 SW. Alder, Suite 1103, Portland, Oreg. 97205

[21] Appl. No.: 574,365

[22] Filed: Jan. 27, 1984

[51] Int. Cl.³ .................. H05B 3/00; F02N 17/02
[52] U.S. Cl. .................. 219/205; 123/142.5 E; 219/208; 219/220; 219/342; 219/346; 219/347; 219/354; 219/520; 219/552; 237/12.3 R; 362/139
[58] Field of Search ........... 219/202, 205, 208, 339, 219/342, 343, 346–358, 220, 520, 552; 237/12.3 R; 123/142.5 R, 142.5 E; 362/139

[56] References Cited

U.S. PATENT DOCUMENTS

| | | | |
|---|---|---|---|
| 1,416,964 | 5/1922 | Moreton | 219/349 |
| 1,547,647 | 7/1925 | Furfaro et al. | 219/349 |
| 1,638,986 | 8/1927 | De Zeng | 362/139 |
| 1,656,754 | 1/1928 | Norris | 362/139 |
| 1,704,873 | 3/1929 | Strout | 219/205 X |
| 1,723,331 | 8/1929 | Cutler | 219/205 |
| 1,786,130 | 12/1930 | Schoenfeld | 219/205 X |
| 1,800,216 | 4/1931 | Hill | 219/347 X |
| 1,817,417 | 8/1931 | Meitzler | 362/139 |
| 1,867,502 | 7/1932 | Edstrom | 219/349 |
| 1,887,782 | 11/1932 | Peterson | 219/348 X |
| 2,095,502 | 10/1937 | Johnston | 219/349 X |
| 2,515,659 | 7/1950 | Michal | 219/342 X |
| 2,613,307 | 10/1952 | La Mirand | 219/342 |
| 2,792,488 | 5/1957 | Giza | 219/520 X |
| 3,053,639 | 9/1962 | Dolloff | 219/349 |
| 3,233,077 | 2/1966 | Miller | 219/205 |
| 3,249,737 | 5/1966 | Casebeer | 219/348 X |

FOREIGN PATENT DOCUMENTS

| | | | |
|---|---|---|---|
| 477085 | 9/1951 | Canada | 219/205 |
| 807591 | 7/1951 | Fed. Rep. of Germany | 219/205 |
| 2224565 | 5/1972 | Fed. Rep. of Germany | 219/346 |
| 533722 | 12/1921 | France | 219/349 |
| 535588 | 1/1922 | France | 219/346 |
| 291441 | 5/1929 | United Kingdom | 219/349 |

Primary Examiner—A. Bartis
Attorney, Agent, or Firm—Chernoff, Vilhauer, McClung, Birdwell & Stenzel

[57] ABSTRACT

A portable heater for radiantly heating the underbody, particularly the engine oil pan or crankcase, of a motor vehicle to facilitate starting in cold weather includes an elongate wheeled support member horizontally positionable adjacent and under the vehicle by a handle on one end of the support member. A radiant energy generator, such as a conventional infrared lamp or an electric resistance element, is mounted on the support member and oriented to project a beam of radiant energy substantially parallel to and along the longitudinal axis of the support member to a planar reflector on the support member downstream of the generator and disposed at an angle to reflect the beam of radiant energy upwardly to portion of the vehicle underbody desired to be heated.

3 Claims, 2 Drawing Figures

PORTABLE HEATER FOR RADIANTLY HEATING THE UNDERBODY OF A MOTOR VEHICLE

The following application relates to a heating device for heating the undercarriages of automobiles in cold weather and more particularly to a heater that utilizes a radiant energy source positioned adjacent the vehicle and a radiant energy reflecter positioned directly beneath the oil pan or crankcase for directing the energy upwards.

In cold weather it is sometimes difficult to start vehicles when unattended for long periods due to the increased viscosity of the oil caused by the cold. In the past several systems have been proposed for applying heat to the undercarriage of a vehicle, usually directly beneath the oil pan or crankcase. For example, it has been proposed to physically attach electric resistance heaters directly underneath the oil pan. An example of such a device is shown in Wells, U.S. Pat. No. 3,330,935. In another patent, Lee, U.S. Pat. No. 3,394,243, an electrical resistance element is held magnetically against the undercarriage of the crankcase. Neither the Lee device nor the Wells device, however, are safe since oil may drip onto the heating element and cause a fire.

In another type of device, Newman U.S. Pat. No. 3,809,527, a forced hot air blower has a conduit which may be positioned directly underneath the crankcase. The conduit directs hot air from a portable heater/blower positioned adjacent the vehicle upwardly against the crankcase. The Newman device is expensive however, requiring a motor, of either an electrical or internal combustion type, mounted on one portable structure and a separate portable structure or dolly on the other end of a flexible conduit for positioning the blower so as to direct air against the crankcase. The Newman device is, therefore, not only expensive, but is large and cumbersome requiring considerable storage space.

SUMMARY OF THE INVENTION

The present invention utilizes the principle of reflection to direct radiant heat energy from a position adjacent the vehicle upwards towards the crankcase. In this manner the fire safety problems of the Lee and Wells devices are avoided. Moreover, since the radiant energy generator can be of the electrical resistance type it needs no motor or other expensive mechanism to generate forced hot air, such as that employed in the Newman device.

The invention comprises a radiant heat or infrared generator which is attached to an elongate support member, and is aimed along the longitudinal axis of the support member. At the other end of the support member, a mirror or other reflecting surface is oriented to reflect heat energy from the infrared generator upwards towards the crankcase. At the mirror end of the elongate support member are a pair of wheels which enable the user to easily position the mirror end, and at the infrared generator end of the support member is an upwardly extending handle attached at an oblique angle to the support member so that the user may easily position the apparatus under a vehicle. A resting block underneath the radiant heat generator keeps the support member parallel to the floor, thus insuring that the radiant heat is reflected upwards by the mirror at the proper angle.

The mirror is affixed to the support member at approximately a 45° angle so that the heat energy generated from a position adjacent the vehicle is reflected 90 degrees upwards toward the vehicle undercarriage. The radiant heat generator may be of the electrical resistance type or may be any type that generates electro-magnetic energy in the infrared region such as a commercially available heat lamp. To prevent energy loss through dispersion, the heat lamp may be enclosed in a reflector such as a parabolic reflector to focus the energy onto the mirror. Since there is no physical connection between the infrared generator and the mirror, the length of the elongate support member may be made adjustable to accommodate the desired vehicle configuration. Thus, the support member comprises a telescoping tubular member of generally rectangular cross-section. The telescoping tubes are engagable at predetermined intervals by threaded pins so as to adjust the support member to its desired length.

It is an object of this invention to provide an apparatus for heating the undercarriage of an automobile or other vehicle with reflected radiant energy thereby eliminating the possibility of fire.

It is a further object of this invention to provide an apparatus which is lightweight, portable and may be easily stored for heating the undercarriage of an automobile.

A still further object of this invention is to provide the aforementioned apparatus inexpensively and without the need for electric motors or auxiliary internal combustion motors.

The foregoing and other objectives, features and advantages of the present invention will be more readily understood upon consideration of the following detailed description of the invention taken in conjunction with the accompanying drawings.

DETAILED DESCRIPTION OF THE DRAWINGS

Figure 1:
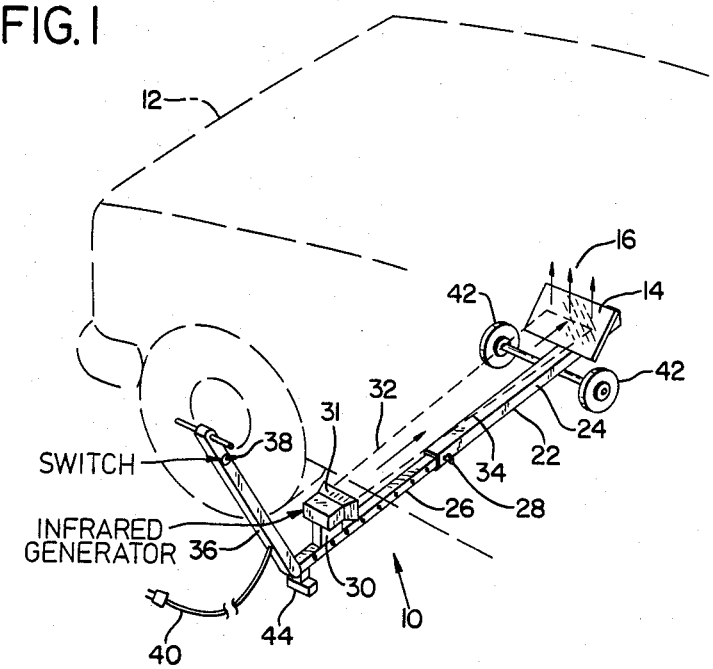
FIG. 1 is a perspective view of the invention positioned under an automobile.
Figure 2:
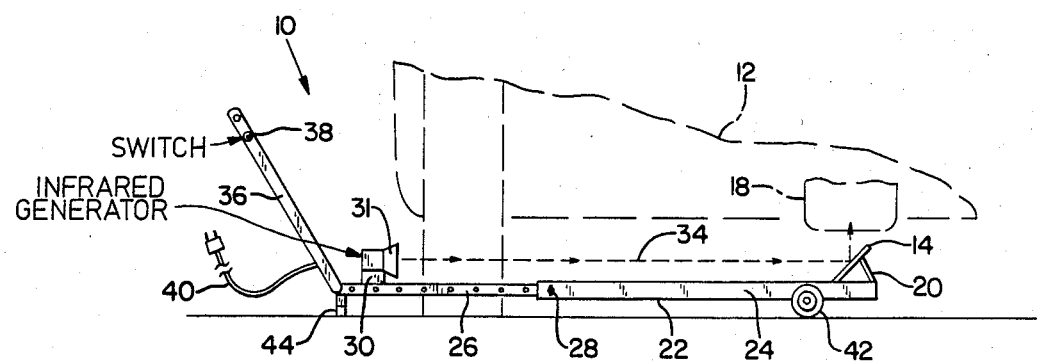
FIG. 2 is side view of the invention shown beneath an automobile.

Portable radiant energy warming device 10 is positioned beneath a automobile or other vehicle 12 so that heat from a reflective surface 14 is directed upwards as indicated by arrows 16 towards the oil pan or crankcase 18. The reflecting surface 14 may be a mirror or any type of planar surface that reflects electromagnetic energy in the infrared region of the spectrum. The reflecting surface 14 may be inclined at any desired angle, however, for most efficient operation it should be inclined at an angle of approximately 45°. The reflecting surface is held in place by a strut 20.

The reflecting surface is supported by the strut 20 on a support member 22. Support member 22 comprises telescoping sections 24 and 26. Section 26 has a plurality of holes drilled at any convenient interval for adjusting the length of the support member 22. A threaded pin 28 screws into a hole on tubular member 24 and mates with one of the holes on tubular member 26 to hold the support member rigid.

At the other end of support member 22 is a radiant energy generating device 30 supported on tubular member 26 and generally aligned to project radiant energy along the longitudinal axis of support member 22 towards the reflecting surface 14. The radiant energy generator 30 may be of any conventional configuration. For example, it may be a heat lamp that generates infrared energy or it may consist of a electric resistance heating element. The generator 30 is enclosed by a reflecting shield 31 which focuses the energy into a collimated beam as illustrated graphically by dotted lines 32 and 34. This reflecting shield 31 may take any conventional form. For example, shield 31 could be a parabolic reflector if an infrared lamp is to be used as the radiant energy generator 30.

For ease in positioning the device, support member 22 has a handle portion 36 inclined upwardly at an oblique angle to the longitudinal axis of telescoping tubes 24 and 26. Located in the handle 36 is a switch 38, and the energy generator 30 may be wired through the switch to a conventional cord and plug 40 for an electrical outlet.

Also to aid in positioning reflecting surface, a pair of wheels 42 may be affixed beneath support member 22. Thus the entire device may be rolled along the surface of the floor and the reflecting surface 14 may be easily positioned under the appropriate automobile undercarriage location. To insure that the reflecting surface 14 is properly oriented, assuming that it is mounted at the perferred 45° angle, a resting block 44 is provided at the oposite end of support member 22 from the reflecting surface 14 to insure that the energy beam is parallel to the floor. In this way the generator 30 directs its energy along the longitudinal axis of the support member 22 against reflecting surface 14, and then straight upwards at a 90° angle from the longitudinal axis of the support member 22. The device is easily stored by loosening the pin 28 and collapsing the tubes to their minimum length.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for heating the underbody of a vehicle comprising:
    (a) an elongate support member having at least one wheel mounted at a first end thereof and a support block mounted at a second end thereof, said wheel and said support block maintaining said support member above the floor and substantially parallel thereto;
    (b) radiant energy generating means mounted on said support member and oriented to project a beam of radiant energy substantially parallel to and substantially along the longitudinal axis of said support member; and
    (c) radiant energy reflecting means mounted on said support member downstream of said radiant energy generating means for reflecting said beam of radiant energy from the generating generally upwardly means to a predetermined location on the underbody of the vehicle.

2. The apparatus of claim 1 further including an upwardly-extending handle connected to the support member at an oblique angle to the longitudinal axis thereof.

3. The apparatus of claim 1 wherein said reflecting means is a substantially planar reflecting surface mounted at a vertical 45 degree angle with respect to the longitudinal axis of the support member.

* * * * *